(12) United States Patent
Ivey

(10) Patent No.: US 11,664,704 B2
(45) Date of Patent: May 30, 2023

(54) PORTABLE ELECTRICAL GENERATOR

(71) Applicant: Bradford Ivey, East Orange, NJ (US)

(72) Inventor: Bradford Ivey, East Orange, NJ (US)

( * ) Notice: Subject to any disclaimer, the term of this patent is extended or adjusted under 35 U.S.C. 154(b) by 0 days.

(21) Appl. No.: 17/816,861

(22) Filed: Aug. 2, 2022

(65) Prior Publication Data

US 2022/0376586 A1 Nov. 24, 2022

Related U.S. Application Data

(63) Continuation-in-part of application No. 17/649,189, filed on Jan. 27, 2022, now Pat. No. 11,404,904, which is a continuation-in-part of application No. 15/856,272, filed on Dec. 28, 2017, now abandoned.

(51) Int. Cl.
| | |
|---|---|
| *H02K 7/18* | (2006.01) |
| *H02P 27/06* | (2006.01) |
| *H02J 7/00* | (2006.01) |
| *H02P 9/08* | (2006.01) |
| *H02K 11/00* | (2016.01) |
| *H02K 5/04* | (2006.01) |

(52) U.S. Cl.
CPC ............... *H02K 7/18* (2013.01); *H02J 7/007* (2013.01); *H02K 11/0094* (2013.01); *H02P 9/08* (2013.01); *H02P 27/06* (2013.01); *H02K 5/04* (2013.01); *Y02T 10/70* (2013.01)

(58) Field of Classification Search
CPC ........ H02K 7/18; H02K 11/0094; H02K 5/04; H02K 7/1807; H02K 53/00; H02J 7/007; H02J 9/062; H02J 9/066; H02J 7/0068; H02J 7/0048; H02P 9/08; H02P 27/06; Y02T 10/70; Y02T 10/7072; Y02E 70/30

See application file for complete search history.

(56) References Cited

U.S. PATENT DOCUMENTS

| | | | | |
|---|---|---|---|---|
| 2015/0214738 A1* | 7/2015 | Covic | ....................... | H02J 3/00 307/31 |
| 2018/0287407 A1* | 10/2018 | Sayre | ....................... | H01F 6/00 |

FOREIGN PATENT DOCUMENTS

| | | | | |
|---|---|---|---|---|
| WO | WO-9908358 A1 * | 2/1999 | ................ | H02P 9/04 |

* cited by examiner

*Primary Examiner* — Michael C Zarroli
(74) *Attorney, Agent, or Firm* — Nolan IP Law; Jason M. Nolan

(57) ABSTRACT

An electrical generator is provided. The electrical generator can include a generator, an electric motor, and a battery. The generator has a rotatable shaft and stationary component and be operatively coupled via a drive belt to the motor, which provides torque to the rotatable shaft of the generator The battery is operatively coupled to the motor. The generator can be operatively coupled to a utility grid via a transformer/invertor that can import current from the utility grid to charge the battery when the utility grid is operating and export current from the generator to a grid connector when the utility grid is not operating.

20 Claims, 4 Drawing Sheets

FIG. 5A

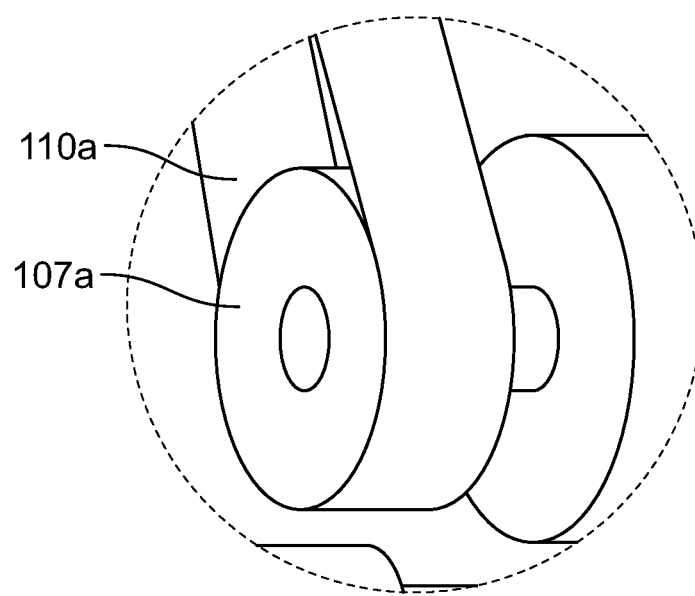
FIG. 5A
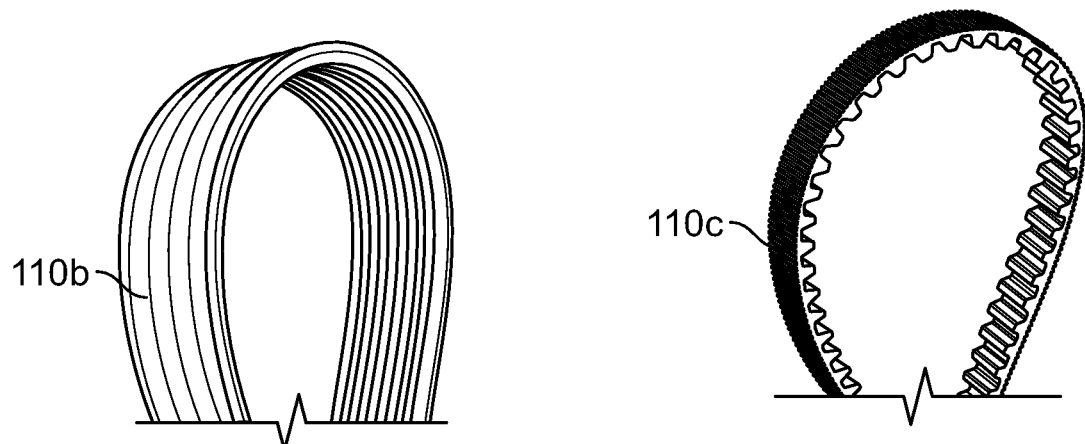
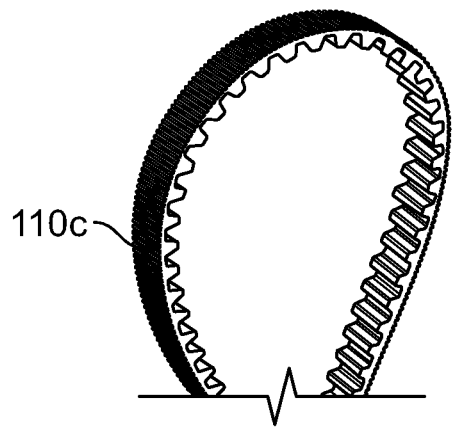
FIG. 5B
FIG. 5C

PORTABLE ELECTRICAL GENERATOR

CROSS REFERENCE TO RELATED APPLICATIONS

This is a continuation-in-part of U.S. patent application Ser. No. 17/649,189, filed on Jan. 27, 2022, which is a continuation-in-part of U.S. patent application Ser. No. 15/856,272, filed on Dec. 28, 2017, the contents of which are relied upon and incorporated herein by reference in their entirety, and the benefit of priority under 35 U.S.C. § 120 is hereby claimed.

FIELD

The present disclosure generally relates to an electrical generator, and more particularly to a portable electrical generator having an electric motor and a transportable electric generator comprising the portable electrical generator.

BACKGROUND

Existing portable electrical generators utilize an internal combustion engine to produce electrical power. Internal combustion engines produce undesirable noises and noxious fumes from burning fuel (e.g., gasoline, diesel, natural gas, propane, biodiesel, water, sewage gas, hydrogen). As a result, electrical generators having an internal combustion engine are not suitable for indoor use. And generally, internal combustion engines are less than 50% efficient with respect to converting heat into mechanical energy. For the foregoing reasons, there is a need for an improved portable electrical generator that can be used to generate electricity indoors for the purpose of powering a domicile or other building and/or to charge one or more electric appliances or devices. And there is a need for a transportable electric generator that can be used in an outdoor area for the purpose of charging one or more electric vehicles.

SUMMARY

In various embodiments, an electrical generator is provided. In some embodiments, the electrical generator, comprises a generator comprising a rotatable shaft and stationary component, the generator being operatively coupled via a drive belt to an electric motor; wherein the electric motor provides torque to the rotatable shaft of the generator; and a battery operatively coupled to the electric motor, wherein the electric motor derives power from the battery; and a battery charger operatively coupled to the battery, wherein the battery charger is configured to supply current to the battery; wherein the generator is configured to be operatively coupled to a utility grid using a transformer/invertor that is configured to import current from the utility grid, optionally to charge the battery, when the utility grid is operating and to export current from the generator to a grid connector when the utility grid is not operating.

In various embodiments, a transportable electric generator is provided. In some embodiments, the transportable electric generator comprises an electrical generator comprising: a generator comprising a rotatable shaft and stationary component, the generator being operatively coupled via a drive belt to an electric motor; wherein the electric motor provides torque to the rotatable shaft of the generator; and a battery operatively coupled to the electric motor, wherein the electric motor derives power from the battery; and a battery charger operatively coupled to the battery, wherein the battery charger is configured to supply current to the battery; wherein the generator is configured to be operatively coupled to a utility grid using a transformer/invertor that is configured to import current from the utility grid, optionally to charge the battery, when the utility grid is operating and to export current from the generator to a grid connector when the utility grid is not operating; and a housing configured to contain the electrical generator and for transportability, the housing comprising an electric plug for coupling the electrical generator to the utility grid.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

FIG. 5A is a zoomed-in view of a shared portion of FIGS. 1 and 2;

FIG. 5B is an alternate embodiment of the components in FIG. 5A; and

FIG. 5C is a further alternative embodiment of the components in FIG. 5A.

Figure 1:
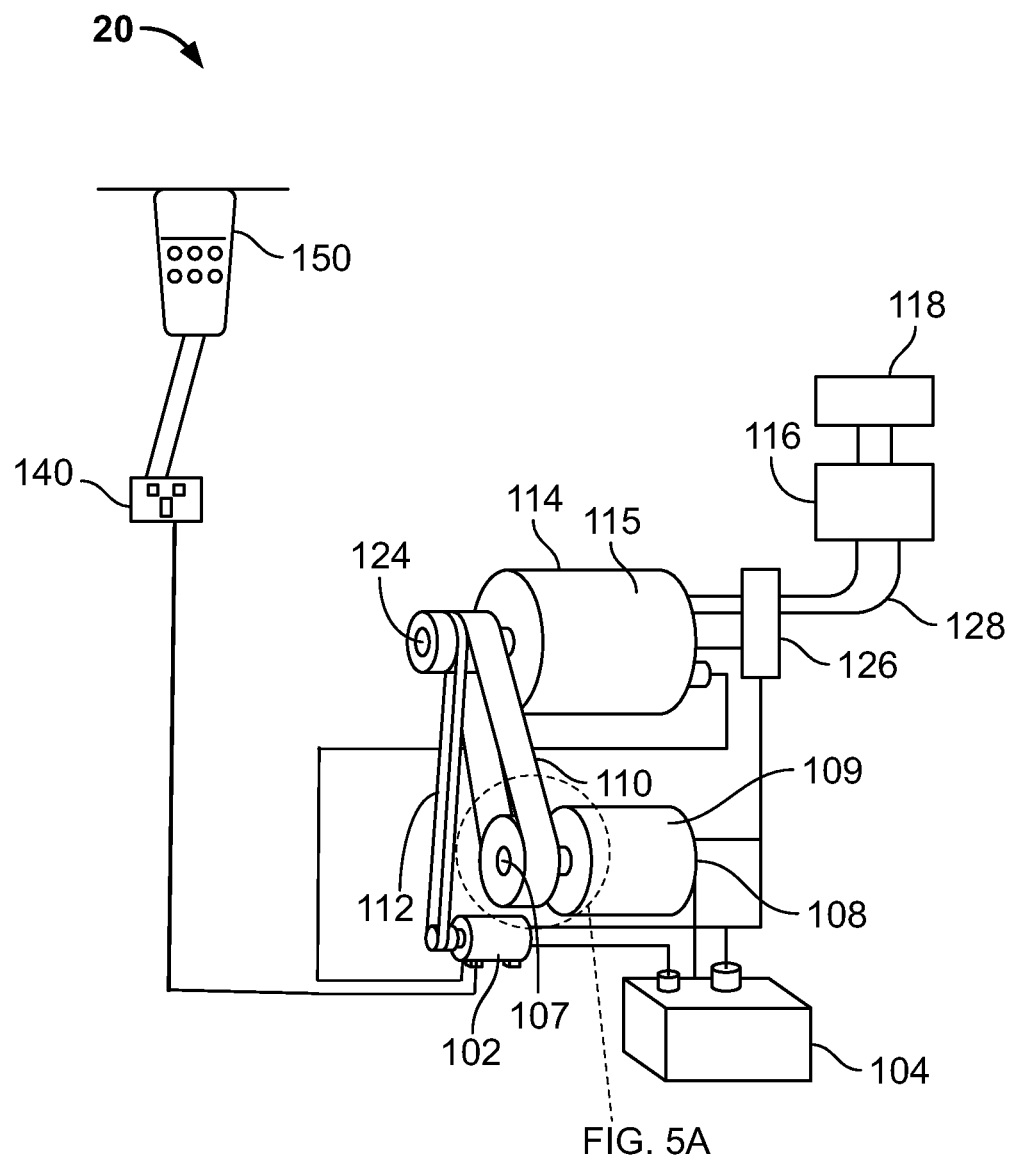
FIG. 1 is a schematic diagram of an electrical generator, in accordance with some embodiments described herein.

The drawings are not necessarily drawn to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which are illustrated in the accompanying drawings. The description of the embodiments is intended to be read in connection with the accompanying drawings. Whenever possible, the same reference characters will be used throughout the drawings to refer to the same or like parts.

Before describing the exemplary embodiments, it is noted the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relative terms such as "horizontal," "vertical," "up," "down," "top," "bottom," and the like, as well as derivatives thereof (e.g., "horizontally," "downwardly," "upwardly," etc.) should be construed to refer to the orientation as then described or as shown in the drawing figure under discussion. These terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

In various embodiments, as shown in FIGS. 1-5C, a portable electrical generator is provided. In some embodiments, as shown in FIG. 1, the electrical generator 20 comprises a generator 114, an electric motor 108, and a battery 104. In some embodiments, the generator 114 is connected to the electrical motor 108 via the drive belt 110.

The generator 114 can be any suitable generator, whereby the suitability of the generator is restricted by the desired size of the portable electrical generator 20 and the amount of electrical power needed for a predetermined purpose. In some embodiments, the generator 114 comprises a rotatable shaft 124 (e.g., a rotor) and a stationary component 115 (e.g., a stator). In such embodiments, the rotatable shaft 124 rotates about the axis defined by its longitudinal structure. In some embodiments, energy flows through the stationary component 115 to and from the rotatable shaft 124. In some embodiments, the stationary component 115 is configured to convert the rotating magnetic field produced by the rotatable shaft 124 into electric current. In such embodiments, the torque is produced around the longitudinal axis of the rotatable shaft 124.

In some embodiments, in which the electrical power generated is for a small-sized domicile or building (e.g., a one- or two-bedroom apartment or condominium unit) the generator 114 is configured to provide power in the range of about 800 watts (0.8 kW) to about 3000 watts (3 kW), including, for example, about 1000 watts (1 kW), about 1500 watts (1.5 kW), about 2000 watts (2 kW), about 2500 watts (2.5 kW), etc. In some embodiments, in which the electrical power generated is for a medium-sized domicile or building (e.g., a larger apartment or condominium unit, or two- or three-bedroom house) the generator 114 is configured to provide about 3000 watts (3 kW) to about 7000 watts (7 kW), including, for example, about 3500 watts 0.5 kW), about 4000 watts (4 kW), about 5000 watts (5 kW), about 6500 watts (6.5 kW), etc. In some embodiments, in which the electrical power generated is for a large-sized domicile or building (e.g., an apartment or condominium building, or four- to eight-bedroom house) the generator 114 is configured to provide about 7000 watts (7 kW) to about 11000 watts (11 kW), including, for example, about 7500 watts (7.5 kW), about 8000 watts (8 kW), about 9000 watts (9 kW), about 10000 watts 00 kW), etc.

The electric motor 108 can be any suitable electric motor. In some embodiments, as shown in FIG. 1, for example, the electric motor 108 comprises a rotor 107 and a stator 109. In such embodiments, the rotor 107 rotates about its longitudinal axis and the stator 109 remains stationary to create an air gap between its inner surface and components and the rotor 107. In such embodiments, the stator 109 provides a magnetic field that drives the rotor 107. In some embodiments, during use, the electrical motor 108 provides the rotational torque to the rotatable shaft 124, which is used to build a flow of current inside the generator 114. In some embodiments, the current can then flow out of circuitry 128 to the main grid connector 118 managing the electrical load to the domicile or building.

In some embodiments, the generator 114 and the electric motor 108 are configured to operate at one or more speeds, including one or more predetermined speeds. In such embodiments, selection of the speed can be controlled by the user via the control panel or computer 150. In some embodiments the generator 114 and the electric motor 108 are configured to operate at one to ten different speeds, or two to eight different speeds, or three to six different speeds, or four to five different speeds. In some embodiments, for example, the generator 114 and the electric motor 108 are configured to operate at four speeds. In such embodiments, the first speed produces about 25 watts, the second speed produces about 50 watts, the third speed produces about 75 watts, and the fourth speed produces about 100 watts. In some embodiments, the speed is selected manually. For example, the user can enter or select the desired speed via the interface on the control panel or computer 150. In some embodiments, the speeds are automatically selected by the control panel or computer 150 based on the information obtained from one or more sensors connected to the electrical generator 20. In such embodiments, the control panel or computer 150 comprises the logic necessary for controlling the output speed based on the information obtained from the sensors.

The battery 104 can be any suitable battery, in which the suitability is based on requirements of the electric motor 108. For example, in some embodiments, the electric motor 108 receives an electric current from the battery 104, as shown in FIG. 1, or a plurality of batteries in a battery bank (omitted for clarity; additional batteries can be coupled together in series). In some embodiments, the electric current is provided from a single battery 104. In some embodiments, the battery 104 is a rechargeable battery. In some embodiments, the battery 104 is a 12V (volt) automotive battery. In some embodiments, the battery 104 is a deep cycle battery, such as a rechargeable lithium-ion battery (e.g., a battery used in a golf cart). In some embodiments, during use, the battery 104 functions by providing the necessary electrical energy to get the electric motor 108 started and running.

In an alternative embodiment, power to the electric motor 108 may originate from a solar panel (not shown), either alone or in combination with the battery 104.

Any suitable drive belt 110 can be used, whereby the suitability of the drive belt 110 is based on the size of the rotatable shaft 124 and torque produced by the same, the size of the rotor 107 and the torque produced by the same, the distance between the electric motor 108 and the generator 114, and/or any other consideration including, e.g., the anticipated periods of use, temperatures of the areas of use, and/or properties of the belt material.

In some embodiments, as shown in FIG. 5A, for example, the drive belt 110a and the corresponding rotor 107a each comprise a smooth contacting surface. In alternative embodiments, as shown in FIG. 5B, for example, the drive belt 110b and the corresponding rotor 107b comprise reciprocal longitudinal, spaced-apart bands on their respective contacting surfaces. The reciprocal bands provide additional, three-dimensional surfaces to reduce the chance of the drive belt 110b becoming disconnected from the rotor 107b. In alternative embodiments, as shown in FIG. 5C, the drive belt 110c and the corresponding rotor 107c comprise reciprocal transverse, spaced-apart bands on their respective contacting surfaces. The reciprocal bands provide additional, three-dimensional surfaces to reduce the chance of the drive belt 110c becoming disconnected from the rotor 107c. Although the alternative embodiments in FIGS. 5A, 5B, and 5C are directed to the drive belt 110b and the corresponding rotor 107b, the same alternative configurations may be applied to the belts 112 and 122, when present, and the rotatable shafts 123 and 124.

In some embodiments, the electrical generator 20 further comprises a battery charger 102 for recharging the battery 104. In some embodiments, the control panel or computer 150, and/or a sensor (not shown) in communication with the battery charger 102 and battery 104, can measure and monitor the level of charge in the battery 104 and signal instructions to the battery charger 102 to send current to the battery 104 for the purpose of recharging the battery. In some embodiments, the battery charger 102 is connected to the rotor 124 via the drive belt 112. In other embodiments, the drive belt 112 is omitted and the battery charger 102, and/or the sensor, receive power from, e.g., a microcontroller (not shown) or an independent battery (not shown).

During use, the control panel or computer 150, and/or the sensor in communication with the battery charger 102 and battery 104, is programed or configured to indicate when the charge of the battery 104 reaches a predetermined threshold. The predetermined charge threshold can be any suitable level, in which the suitability is based on the attributes of the battery 104 (e.g., type, age, condition, specifications). In some embodiments, for example, the predetermined charge threshold is a remaining charge in the range of about 5% to about 60%, from about 10% to about 50%, from about 15% to about 40%, from about 20% to about 30%, etc. In this context, the term "about" refers to ±3%. In some embodiments, the control panel or computer 150, and/or the sensor in communication with the battery charger 102 and battery 104, is configured to signal that the level of charge measured on the battery 104 has reached about 100%, which will cause the battery charger 102 to power down.

In some embodiments, the electrical generator 20 further comprises a combined transformer/invertor 126. In such embodiments, the transformer component of the combined transformer/invertor 126 functions by transferring electrical energy from one electrical circuit to another circuit. In FIG. 1, for example, the electrical energy produced by the generator 114 can be transferred to the main grid connector 118 via the electric power switch 116. In such embodiments, the invertor component of the combined transformer/invertor 126 functions to convert power from a direct current (DC) source into alternating current (AC) power. In some embodiments, during use, the electric power switch 116 is configured to turn on/off power to the electrical generator 20 when power is restored to the domicile or building utilizing the electrical generator 20. In some embodiments, the electric power switch 116 comprises a manual switch component for manually turning on/off the flow of current to or from the main grid connector 118 and the transformer/invertor 126.

In some embodiments, the transformer/invertor 126 can function such that the electrical generator 20 receives and imports current from the utility grid to charge the battery 104 when the utility grid is operating, e.g., under normal conditions, and to deliver or export current from the generator 20 to a grid connector when the utility grid is not operating or is operating at below normal conditions.

In some embodiments, during use, while the main grid connector 118 is properly energized, the power switch 116 transmits current over the transformer/invertor 126 to the battery 104. In some embodiments, when the transformer/invertor 126 detects that the battery 104 has reached a proper voltage level across its terminals, the transformer/invertor 126 interrupts the flow of current to the battery 104.

Figure 2:
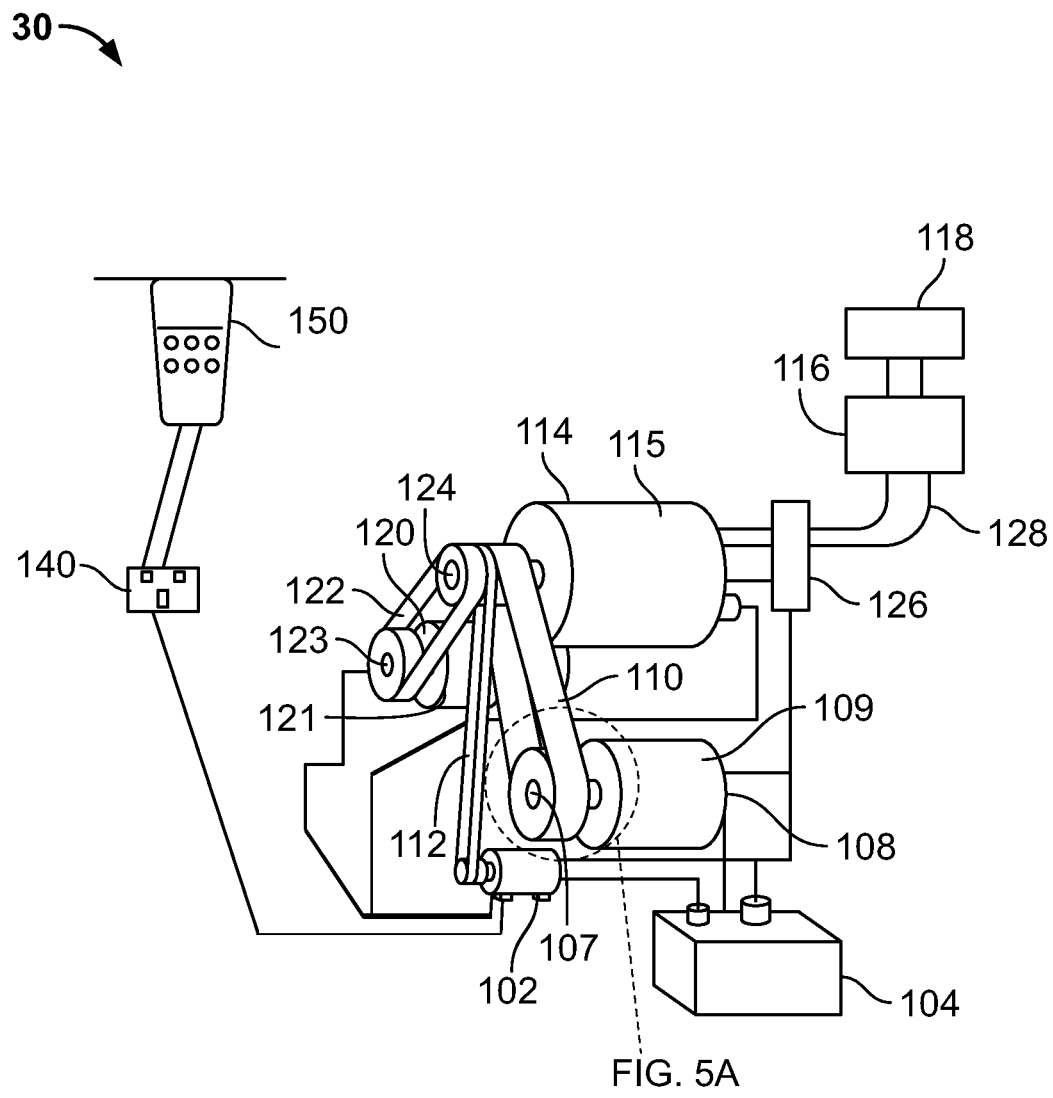
FIG. 2 is a schematic diagram of an alternative electrical generator, in accordance with some embodiments described herein.
Figure 4:
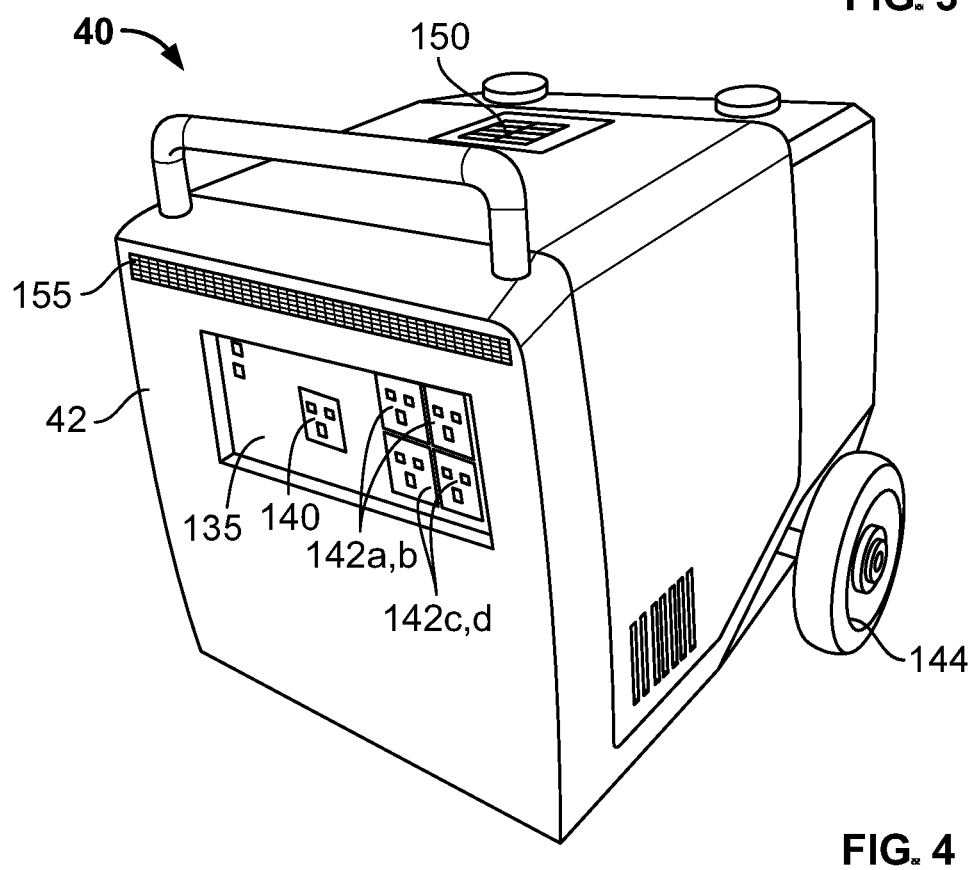
FIG. 4 is a front perspective view of the transportable electrical generator of FIG. 3.

In some embodiments, as shown in FIGS. 1, 2, and 4, the electrical generator 20/30/40 further comprises the receptacle 140 for receiving the plug of an electrical device. The receptacle 140 can be used in the same manner as existing receptacles in a domicile, in which the plug of an electrical device is inserted into the corresponding openings of the receptacle. In some embodiments, the receptacle 140 is configured to receive the plug of an electric vehicle.

In some embodiments, as shown in FIGS. 1-4, the electrical generator 20 further comprises the control panel or computer 150. In some embodiments, the control panel or computer 150, being wired directly or indirectly to each of the components of the electrical generator 20/30/40, can be configured to monitor, analyze, and display the functional status of the components. For example, the control panel or computer 150 can indicate which component may need to be serviced or replaced. For example, the control panel or computer 150 can display the level of charge in the battery 104. In some embodiments, the level of charge remaining in the battery 104 is obtained from the sensor in communication with the battery charger 102 and battery 104, and the information is communicated from the sensor to the control panel or computer 150. In some embodiments, the control panel or computer 150 can be configured to instruct one or more components to function. For example, the control panel or computer 150 can instruct the transformer 126 to send step-down current to the battery 104 for the purpose of recharging the battery. In some embodiments, the control panel or computer 150 is further connected, either directly or indirectly, to the main grid connector 118 managing the electrical load to the domicile or building. In such embodiments, the control panel or computer 150 displays the amount of current received from the main grid that can be transmitted to through the main grid connector 118 to the electrical generator 20.

In some embodiments, as shown in FIG. 2, the electrical generator 30 further comprises a turbine engine or secondary electric motor 120. In such embodiments, the turbine engine or secondary electric motor 120 can function as a second generator or as a second motor to drive the generator 114. In some embodiments, the current generated by the turbine engine or secondary electric motor 120 can be transmitted to the circuitry (not shown) via the stator 121. In such embodiments, the rotor 123 is connected to the rotatable shaft 124 of the generator 114 via the drive belt 122.

Figure 3:
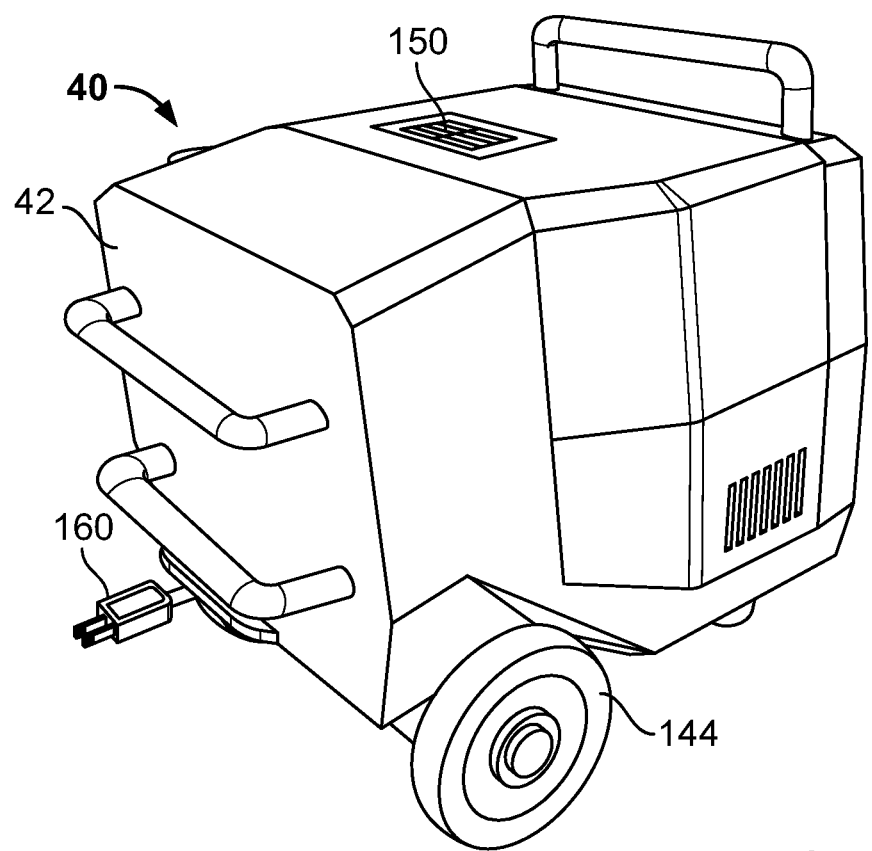
FIG. 3 is a rear perspective view of a transportable electrical generator, in accordance with some embodiments described herein.

In various embodiments, as shown in FIGS. 3 and 4, a transportable electric generator 40 is provided. In some embodiments, the transportable electric generator 40 comprises the electrical generator 20 or the electrical generator 30 and a housing 42 configured to contain the electrical generator 20/30. In some embodiments, the housing 42 comprises access to the control panel or computer 150. In some embodiments, the housing 42 further comprises a plurality of wheels 144 for portability (e.g., two wheels as shown in FIGS. 3 and 4; or three wheels (not shown); or four wheels (not shown)). In some embodiments, the housing 42 further comprises a light 155 (e.g., LED light) for assisting the user in a dark environment.

In various embodiments, the receptacle 140 of the electrical generator 20/30 is mounted to the housing 42 in a manner accessible to the user, whereby the receptacle 140 is configured to receive the plug of an electric vehicle and/or an electric device. In some embodiments, the transportable electric generator 40 further comprises a plurality of receptables for electric or electronic devices. For example, as shown in FIG. 4, the housing comprises a panel of electrical receptables 140 and 142a-142d on the panel 135.

In some embodiments, as shown in FIG. 3, the transportable electric generator 40 further comprises the electric plug 160, which is attached via an electric cord. In some embodiments, the control panel or computer 150 can be configured to measure the current received from the main grid connector 118 and that will be transmitted to the electrical generator 20/30. For example, in some embodiments, the electric plug 160 comprises a sensor for measuring the current received from the main grid connector 118, and the sensor transmits the information to the control panel or computer 150. In some embodiments, the control panel or computer 150 is configured to communicate the absence of power in the domicile. For example, if the power to the domicile has been temporarily discontinued, then the control panel or computer 150, and/or the sensor measuring current received from the main grid connector 118, is configured to signal when the power to the domicile has been restored. In such embodiments, when the control panel or computer 150 determines that power has been restored to the domicile, the electrical generator 20/30 will be turned off.

In some embodiments, the transportable electric generator 40 further comprises a manual switch for powering the system on or off. In such embodiments, the manual switch may be positioned on the control panel or computer 150 or on the panel 135 (FIG. 4). In such embodiments, the user would not need to rely exclusively on the control panel or computer 150, or the sensor measuring the current received from the main grid connector 118. For example, if power service was discontinued to a domicile and then restored, the user would generally be aware that power was restored and could use the switch to turn the transportable electric generator 40 off.

The transportable electric generator 40 and associated housing 42 can be any suitable size and have any suitable shape. In this context, the suitability of the size and shape is based on the capability of being operatively transportable. For example, in some embodiments, the size and weight of the housing 42 is configured to allow the user to transport the housing 42 about a ground surface (e.g., sidewalk, grass), or to allow the user to lift the transportable electric generator 40 into a vehicle, up/down a set of stairs, down the hallway of a domicile, etc. In such embodiments, the materials used to create the housing 42 are preferably lightweight and durable for the desired purposes, including transportability.

In some embodiments, the electrical generator disclosed herein is small enough for utilization in a small home, apartment, or condominium. The electrical generator stores energy in batteries and can be powered by a power outlet. The electrical generator can utilize one or more electric motors to produce energy, which is stored in the batteries. The electrical generator can be used as a stand-alone unit that can receive a plug connected to an electrical device in the event of a power outage. The electrical generator can be hard-wired into the electrical circuitry of the domicile, and therefore function as a backup power source in the event of a power outage. In such embodiments, the electrical generator will recharge the battery during operation.

In some embodiments, the electrical generator disclosed herein utilizes power from a traditional power source. For example, the electrical generator can be plugged into an outlet or directly connected to circuit box. In such embodiments, the electrical generator can be used to power electrical devices in the event of a power outage. The electrical generator does not use gas, oil, or any other type of fuel, and therefore produces no carbon-based emissions. In such embodiments, the electrical generator provides a clean and reliable source of energy for a domicile.

In some embodiments, when the electrical generator disclosed herein is used for small home, apartment, or condominium, it is small enough in size to fit into a closet. As an indoor unit, the electrical generator described herein is advantageous because it minimizes noise and eliminates the emission of noxious fumes.

In some embodiments, the electrical generator is designed to serve as a backup generator during a power outage. The electrical generator can be wired into the main grid supply line to charge onboard batteries while the grid is operating normally. If the current flow over the grid drops, a switch over which the generator has been connecting to the grid is tripped to power the generator and restore electricity to the internal circuitry of the apartment unit. In some embodiments, the electrical generator motor may be powered by a battery or battery pack. In some embodiments, the electrical generator may have a connection to an external solar panel that is wired to either recharge the batteries or to provide current directly to the generator. In such embodiments, the electrical generator will recharge the battery during operation.

Exemplary embodiments of the device are described above in detail. The device is not limited to the specific embodiments described herein, but rather, the device may be utilized independently and separately from the other components described herein.

Although specific features of the present embodiments may be shown in some drawings and not in others, this is for convenience only. In accordance with the principles of the disclosure, any feature of a drawing may be referenced and/or claimed in combination with any feature of any other drawing.

The foregoing is provided for purposes of illustrating, explaining, and describing embodiments of this disclosure. Modifications and adaptations to these embodiments will be apparent to those skilled in the art and may be made without departing from the scope or spirit of this disclosure.

Although the subject matter has been described in terms of exemplary embodiments, it is not limited thereto. Rather, the appended claims should be construed broadly, to include other variants and embodiments, which may be made by those skilled in the art.

I claim:
1. An electrical generator system, comprising:
a generator comprising a rotatable shaft and stationary component, the generator being operatively coupled via a drive belt to an electric motor; wherein the electric motor provides torque to the rotatable shaft of the generator; and a battery operatively coupled to the electric motor, wherein the electric motor derives power from the battery; and a battery charger operatively coupled to the battery, wherein the battery charger is configured to supply current to the battery;

wherein the generator is configured to be operatively coupled to a utility grid using a transformer/inverter that is configured to import current from the utility grid when the utility grid is operating and to export current from the generator to a grid connector when a drop in current flowing from the utility grid occurs;

further comprising a control panel for operating and monitoring components of the electrical generator system, wherein the battery charger is in communication with the control panel, and the control panel is configured to indicate a level of charge remaining in the battery.

2. The electrical generator system of claim 1, further comprising a secondary motor.

3. The electrical generator system of claim 2, wherein the secondary motor is operatively coupled to the stationary component; and wherein the secondary motor configured to be used in parallel with the generator to generate electric current or as a driver for the generator.

4. The electrical generator system of claim 1, wherein the battery charger is operatively coupled to the generator via a second drive belt.

5. The electrical generator system of claim 1, wherein the control panel is configured to provide manual override commands to the generator.

6. The electrical generator system of claim 1, wherein the generator is configured to provide about 1 kW of power.

7. The electrical generator system of claim 1, wherein the generator is configured to provide about 3 kW of power.

8. The electrical generator system of claim 1, wherein the generator is configured to provide about 7 kW of power.

9. The electrical generator system of claim 1, wherein the electric motor comprises a rotor and stator.

10. The electrical generator system of claim 1, wherein electricity derived from the generator is converted via the transformer/inverter into AC power for powering a domicile or electric device.

11. A transportable electric generator system, comprising: an electrical generator comprising:

a generator comprising a rotatable shaft and stationary component, the generator being operatively coupled via a drive belt to an electric motor; wherein the electric motor provides torque to the rotatable shaft of the generator; and a battery operatively coupled to the electric motor, wherein the electric motor derives power from the battery; and a battery charger operatively coupled to the battery, wherein the battery charger is configured to supply current to the battery;

wherein the generator is configured to be operatively coupled to a utility grid using a transformer/inverter that is configured to import current from the utility grid when the utility grid is operating and to export current from the generator to a grid connector when a drop in current flow from the utility grid occurs; and a housing configured to contain the electrical generator and for transportability, the housing comprising an electric plug for coupling the electrical generator to the utility grid.

12. The transportable electric generator system of claim 11, wherein the housing further comprises a control panel or computer for operating the electrical generator.

13. The transportable electric generator system of claim 11, wherein the housing further comprises one or more receptacles configured to receive an electric plug from an electric vehicle or device.

14. The transportable electric generator system of claim 11, wherein the electrical generator further comprises a secondary motor;

wherein the secondary motor is operatively coupled to the stationary component of the generator; and wherein the secondary motor configured to be used in parallel with the generator to generate electric current or to provide power for the generator.

15. The transportable electrical generator system of claim 12, wherein the battery charger is in communication with the control panel, and the control panel is configured to indicate a level of charge remaining in the battery.

16. The transportable electric generator system of claim 11, wherein the generator is configured to provide about 1 kW of power.

17. The transportable electric generator system of claim 11, wherein the generator is configured to provide about 3 kW of power.

18. The transportable electric generator system of claim 11, wherein the generator is configured to provide about 7 kW of power.

19. An electrical generator system, comprising:

a generator comprising a rotatable shaft and stationary component, the generator being operatively coupled via a drive belt to an electric motor; wherein the electric motor provides torque to the rotatable shaft of the generator; and a battery operatively coupled to the electric motor, wherein the electric motor derives power from the battery; and a battery charger operatively coupled to the battery, wherein the battery charger is configured to supply current to the battery;

wherein the generator is configured to be operatively coupled to a utility grid using a transformer/inverter that is configured to import current from the utility grid when the utility grid is operating and to export current from the generator to a grid connector when a drop in current flowing from the utility grid occurs; and wherein electricity derived from the generator is converted via the transformer/invertor into AC power for powering a domicile or electric device.

20. The electrical generator system of claim 19, further comprising a control panel for operating and monitoring components of the electrical generator system, wherein the battery charger is in communication with the control panel, and the control panel is configured to indicate a level of charge remaining in the battery.

\* \* \* \* \*